United States Patent [19]

Fuwa et al.

[11] Patent Number: 4,794,736

[45] Date of Patent: Jan. 3, 1989

[54] ARRANGEMENT FOR MECHANICALLY AND ACCURATELY PROCESSING A WORKPIECE WITH A POSITION DETECTING PATTERN OR PATTERNS

[75] Inventors: Shigehiro Fuwa; Naoki Fujii; Toshikazu Hatsuse, all of Tokorozawa; Masaru Ito, Tokyo; Toshiaki Wada; Junichi Nakaoka, both of Osaka, all of Japan

[73] Assignee: Citizen Watch Co., Ltd., Japan

[21] Appl. No.: 168,540

[22] Filed: Mar. 8, 1988

Related U.S. Application Data

[63] Continuation of Ser. No. 945,561, Dec. 23, 1986, abandoned.

[30] Foreign Application Priority Data

Dec. 27, 1985 [JP] Japan ................................ 60-295914
Dec. 27, 1985 [JP] Japan ................................ 60-295915
Dec. 27, 1985 [JP] Japan ................................ 60-295916

[51] Int. Cl.⁴ ............................................. B24B 49/12
[52] U.S. Cl. ............................ 51/165.72; 125/13 R
[58] Field of Search ................... 51/165.72, 165.77; 125/13 R; 83/71, 74, 365

[56] References Cited

U.S. PATENT DOCUMENTS 4,167,174 9/1979 Hampton ...................... 51/165.72
4,407,262 10/1983 Wirz ............................. 51/165.72
4,638,601 1/1987 Steere et al. .................. 51/165.72

FOREIGN PATENT DOCUMENTS 59-43820 10/1984 Japan .
2139348 11/1984 United Kingdom .

Primary Examiner—Frederick R. Schmidt
Assistant Examiner—Maurina Rachuba
Attorney, Agent, or Firm—Finnegan, Henderson, Farabow, Garrett and Dunner

[57] ABSTRACT

An arrangement for mechanically processing a workpiece having a position detecting pattern or patterns formed thereon has a mechanically processing tool disposed at a predetermined position, a worktable arranged so as to be linearly moved in at least one of the rectangular coordinate X- and Y-axes while holding the workpiece thereon, and a position aligning unit provided with an opto-electric line sensor capable of detecting one of the patterns of the workpiece and issuing pattern detected signals, and an operation/control unit capable of mathematically processing the detected signals from the line sensor to determine a position of the workpiece to be mechanically processed and generating control signals for controlling the movement of the worktable so that the position to be mechanically processed is aligned with the position of the mechanically processing tool. The line sensor may be a CCD type line sensor.

16 Claims, 11 Drawing Sheets

ARRANGEMENT FOR MECHANICALLY AND ACCURATELY PROCESSING A WORKPIECE WITH A POSITION DETECTING PATTERN OR PATTERNS

This application is a continuation of application Ser. No. 945,561, filed Dec. 23, 1986, now abandoned.

BACKGROUND OF THE INVENTION

1. Field of the Invention

The present invention relates to a mechanically processing arrangement for a workpiece having an optically sensed position detecting pattern or patterns formed thereon, and more particularly, relates to an arrangement for accurately positioning a workpiece at a predetermined position suitable for a mechanical processing of the workpiece by the utilization of a position detecting pattern or patterns formed on the workpiece, and a position aligning system having an opto-electric position detector unit including a line sensor, and mechanically processing the same by means of a machine tool, such as a severing tool, a scoring tool, a grooving tool, or a boring tool, with a high accuracy.

2. Description of the Related Art

When a workpiece, such as a semiconductor wafer, is separated into a plurality of individual pieces, such as rectangular semiconductor chips, a severing apparatus having a cutting tool and a worktable for mounting a workpiece, which is capable of moving both in the X- and Y-axes lying in a plane and rotating about an axis perpendicular to the plane, is employed. The worktable on which a workpiece is mounted, is fed in the X- and Y-axes and is rotated about the rotating axis so that a desired severing position of the workpiece is accurately brought into a predetermined position suitable for severance by the cutting tool. That is, the severing apparatus must be provided with an accurate position aligning unit.

A typical alignment system is disclosed in, for example, GB No. 2 139 348 A, in which a part of the surface of a workpiece, i.e., a surface area of the workpiece including a position to be severed, is taken as a two dimensional image by a camera to detect the position to be severed. The taken image is output and subjected to a differential computation so as to detect position information of a street formed in the severed position with respect to both the X- and Y-axes. Thus, the detected position to be severed and having the street is aligned with a cutting tool.

Another position alignment apparatus is disclosed in Japanese Examined Patent Publication No. 59-43820, granted to the Hitachi Mfg. Company of Japan. The position alignment apparatus is adapted for carrying out a position alignment between a semiconductor wafer and a masking, and is provided for establishing a relative position alignment between a first objective article, such as a semiconductor wafer, having a first aligning pattern and a second objective article, such as a masking, having a second aligning pattern. The apparatus is characterized by comprising an optical system for focussing an image formed by overlapping the first and second aligning patterns, an image sensor for obtaining image signals of the image in the X- and Y-axis directions, and an aligning means for detecting a displacement between the first and second objective articles in both the X- and Y-axes on the basis of the image signals in the X- and Y-axes delivered from the image sensor, and causing a relative movement of the first and second objective articles in the X- and Y-axes direction until the displacement is eliminated.

Operation of the above-mentioned two conventional position alignment system is based upon the technique of opto-electrically converting an objective article or articles into a two dimensional image or images thereof, and then processing the electric signals of the image or images to achieve the position alignment. Therefore, a long time is required to complete the processing of the electric signals of the two dimensional images. Further, the use of the two dimensional image of an objective article brings about a problem such that there is a limited resolution in the detection of the two dimensional image of the objective article. Accordingly, the accuracy of the position detection of the objective article is insufficient. As a result, when the conventional position alignment system is accommodated in a mechanical processing machine, such as a wafer severing machine, the accuracy of the mechanical processing of the objective article, such such as a semiconductor wafer, is insufficient. Also, it takes a long time to carry out the mechanical processing of the objective article, and as a result, during the mechanical processing operation, a rise in temperature occurs, due to friction between a processing tool and the objective article. This temperature raise will cause an error in the position alignment of the objective article.

SUMMARY OF THE INVENTION

Accordingly, an object of the present invention is to eliminate the above-mentioned drawback encountered by the conventional position alignment system able to be accommodated in a mechanical processing apparatus of a workpiece.

Another object of the present invention is to provide a novel arrangement for carrying out a rapid and accurate position alignment of a workpiece having position detection pattern or patterns formed thereon which are optically sensed by an opto-electric line sensor, and for carrying out a mechanical processing of the workpiece by the use of a processing tool, such as a severing tool or a scoring tool, at a high accuracy.

A further object of the present invention is to provide an arrangement for mechanically processing a workpiece having a position detection pattern or patterns formed thereon, which arrangement can automatically adjust an error of the position alignment, caused by a temperature raise during a repeated mechanical processing operation, thereby enhancing the processing accuracy.

In accordance with the present invention, there is provided an arrangement for mechanically processing a workpiece having at least one optically sensable position detecting pattern formed thereon having a latent reference line against which a desired position of the workpiece to be mechanically processed is established. The arrangement comprises a worktable for mounting a workpiece thereon, arranged to be linearly movable in at least one axial direction of the X- and Y-perpendicular coordinate axes extending in a plane; drive means including a table drive means for linearly moving the worktable in accordance with drive control information; a machining tool to effect a mechanical processing of the workpiece mounted on the worktable when the desired position of the workpiece is moved to and positioned at a predeterminend position suitable for engagement with the machining tool; a tool carrier carrying the machining tool and provided with a tool feed means for engaging the machine tool with the workpiece when carrying out the mechanical processing of the workpiece; a position aligning system for carrying out a position alignment of the desired position of the workpiece with the predetermined position suitable for engagement with the machine tool, the position aligning system comprising: a position detector arranged at a fixed position with respect to the machining tool, and having an opto-electric line sensor capable of issuing an electrical signal indicating a linear amount of displacement of the position detecting pattern of the workpiece in at least one axial direction of the X- and Y-coordinate axes by scanning the position detecting pattern in a predetermined single axial direction of the X- and Y-coordinate axes when the workpiece mounted on the worktable is positioned beneath the position detector, and an operation and control unit connected to the position detector for carrying out a mathematical operation to detect the latent reference line of the position detecting pattern and the desired position of the workpiece to be mechanically processed in accordance with the electrical signal from the position detector, the operation and control unit being further connected to the table drive means for providing the table drive means with the drive control information for moving the worktable until the desired position of the workpiece to be mechanically processed is aligned with the predetermined position suitable for engagement with the machine tool.

BRIEF DESCRIPTION OF THE DRAWINGS

The present invention will become more apparent from the ensuing description of the embodiments with reference to the accompanying drawings, wherein.

DESCRIPTION OF THE PREFERRED EMBODIMENTS

Figure 1A:
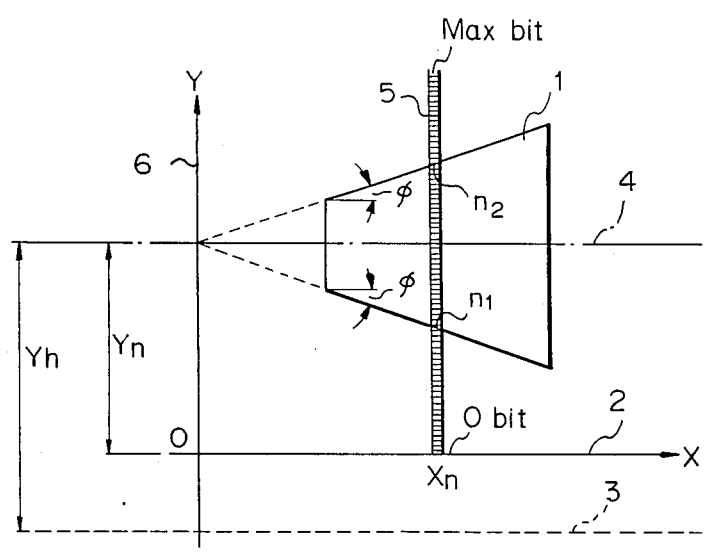
FIG. 1A is an explanatory diagram illustrating a typical position detecting pattern formed on a workpiece to be mechanically processed, and the operation of an opto-electric line sensor of a position aligning system accommodated in an arrangement for mechanically processing a workpiece, according to the present invention.

Referring to FIG. 1A, a typical position detecting pattern 1 are formed on a workpiece to be mechanically processed is shown, and located at a position ready for being detected by a line sensor 5 which per se can be a known opto-electric line sensing device, e.g., a Charge Coupled Device (CCD) type line sensor electrically driven by clock pulses. The pattern 1 has the shape of a trapezoid symmetrical with respect to a center line 4 (a non-visible line to be used as a latent reference line). When the workpiece is a semiconductor wafer, the pattern 1 is formed by a thin film, such as aluminum film having a high reflectivity. An angle $\phi$ is an inclination of the two sides of the trapezoid, respectively.

The description of the principle of the position aligning by the use of the line sensor 5 will be provided hereinbelow with reference to FIGS. 1A and 1B.

When the workpiece having the position detecting pattern 1 is mounted on a worktable (not shown), and when a non-visible line of the workpiece, designated by a dotted line 3 is to be detected and aligned with a predetermined position located apart from the worktable, the position detecting pattern 1 of the workpiece is moved by the worktable to a position beneath the line sensor 5 arranged apart from the worktable. The line sensor 5 has a plurality of sensing elements from a 0-bit sensing element to the maximum number-bit sensing element, and it is here assumed that the 0-bit sensing element of the line sensor 5 lies on the X-coordinate axis of a fixed rectangular coordinate system used for defining the X- and Y-coordinates of each position of the workpiece mounted on the worktable. It is also assumed that the above-mentioned predetermined position coincides with the X-coordinate axis of the fixed coordinate system and designated by a reference numeral 2 (the Y-axis is designated by a reference numeral 6). The line sensor 5 detects the portion of the pattern 1 located beneath the line sensor 5 per se as an optical linear image, by the sensing elements between the $n_1$- and $n_2$-bit sensing elements. The linear sensor 5 in turn generates an electric detection signal which is taken by the frequency of the driving clock pulses as an analog signal having the output wave-shape shown in FIG. 1B.

Figure 1B:
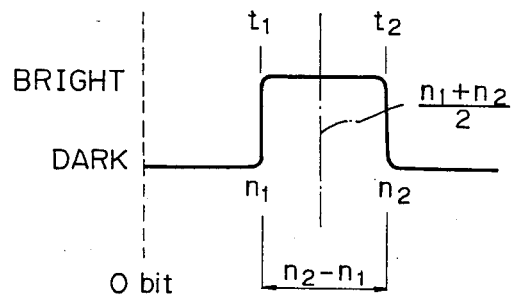
FIG. 1B is a diagram illustrating the wave-shape of an output from the opto-electric line sensor of FIG. 1A.

The output of the line sensor 5 shown in FIG. 1B includes position information with respect to the width of the pattern 1 in the Y-axis direction as well as the coordinate $Y_n$ of the center line 4.

The coordinate $Y_n$ of the center line 4 of the pattern 1 corresponding to the distance from the X-axis 2 to the position of the center line 4 is obtained from the equation (1), below.

$$Y_n = K \cdot (n_1 + n_2)/2 \qquad (1)$$

where K designates a constant determined by the size of each sensing element of the line sensor 5 and a magnifying power of the microscope (not shown) in which the line sensor 5 is contained, and $n_1$ and $n_2$ are the numbers of clock pulses counted by an appropriate pulse counter with respect to the rise and fall positions of the output wave-shape of the line sensor 5 on the basis of the position of the X-coordinate axis 2.

Also, as required, it is possible to obtain the coordinate $X_n$ of the position of the pattern 1 detected by the line sensor 5 on the basis of the Y-axis 6, by the equation (2), below.

$$X_n = (n_2 - n_1) \cdot K/2 \tan \phi \qquad (2)$$

Since the distance Yh between the line 3 and the center line 4 of the position detecting pattern 1 is preliminarily given as a known value, when the position of the center line 4 of the pattern 1 is detected from the equation (1), above, it is possible to detect a displacement $(Yh - Y_n)$ of the line 3 of the workpiece and the X-coordinate axis 2 in the Y-axis direction. Thus, it is also possible to align the line 3 with the 0-bit element position of the line sensor 5, i.e., the predetermined position 2 located apart from the worktable, by moving the worktable.

It will be easily understood that the position alignment of the workpiece in the X-axis direction with respect to the Y-coordinate axis 6 can be similarly achieved by obtaining the above-mentioned coordinate $X_n$ from the equation (2), above.

At this stage, it is to be noted that the above-mentioned number of clock pulses $n_1$ and $n_2$ can be counted by using a pair of conventional re-settable pulse counters, one for counting the number of clock pulses $n_1$ during the time period from 0 to the timing $t_1$ of FIG. 1B, and the other for counting the number of clock pulses $n_2$ during the time period from 0 to the timing $t_2$ of FIG. 1B. The two pulse counters, of course, must be operated by the clock pulses in synchronization with one another. Thus, from the result of the counting of the two pulse containers, it is possible to electrically process the mathematical operation of the equations (1) and (2).

From the foregoing description of the principle of the position detecting and aligning operation carried out through the line sensor, it will be understood that, according to the present invention, since single dimensional image signals or information of a position detecting pattern, e.g., the above-mentioned pattern 1 formed on a workpiece, can be obtained by the line sensor and are used for detecting a displacement of a particular position of the workpiece from a predetermined position apart from the workpiece, and since the mathematical operation to obtain the amount of the displacement is carried out by using simple mathematical equations, the position alignment of the particular position of the workpiece with the predetermined position can be achieved at a high speed.

That is, in the conventional position alignment system, since the two dimensional information regarding a position of a workpiece to be aligned with another position located apart from the workpiece, is used, an image sensor, such as a CCD type area sensor having, e.g., 512×512 sensing elements, must be employed and the image signals from all of the sensing elements must be mathematically processed in an operation processing unit, and this mathematical process takes long time.

On the other hand, in the present invention, the single dimensional information obtained by the line sensor is used for accomplishing the position alignment of a workpiece with respect to a predetermined position located apart from the workpiece. Therefore, the time required for the mathematical processing of the single dimensional information can be short. Moreover, since the line sensor can be a commercially available unit having linearly arrayed 2048 through 4096 bits sensing elements, the opto-electric resolution in the detection of a position detecting pattern can be considerably higher than the conventional area sensor having 512×512 sensing elements, although the latter has more elements than the line sensor. Thus, when the abovementioned position aligning system is accommodated in a mechanically processing apparatus for a workpiece, such as a workpiece severing apparatus, a desired position of the workpiece to be severed can be accurately detected and aligned with a severing tool. Accordingly, the accuracy of the severing of the workpiece, such as a semiconductor wafer, into a plurality of separate pieces, such as a plurality of semiconductor chips, can be high.

In accordance with the above-mentioned principle of the position alignment of a workpiece, employing the opto-electric line sensor, when a plurality of position alignments and mechanical processings of a workpiece are carried out, it is possible to perform a fine adjustment of each position alignment of the workpiece on the basis of the preceding position alignment and mechanical processing of the same workpiece. This fine adjustment based on the preceding position alignment and mechanical processing will be described hereinbelow with reference to FIG. 1C in addition to FIGS. 1A and 1B.

Generally, when a mechanical processing of a workpiece is carried out by a processing tool, such as an abrasive wheel rotating at a high speed, frictional heat generated between the wheel and the workpiece causes a change in, for example, the length of a rotating shaft on which the abrasive wheel is mounted. As a result, the position of the abrasive wheel is displaced from the original predetermined position. Therefore, it is necessary to adjust the positional relationship between the abrasive wheel and the workpiece after the completion of the respective position alignment and mechanical processing of a workpiece, and before the start of the subsequent mechanical processing of the workpiece.

In accordance with the present invention, the fine adjustment of the position alignment is performed in such a manner that, before a subsequent position of the workpiece to be mechanically processed is detected by the use of the position detecting pattern of the workpiece and the line sensor, a displacement of the preceding actually processed position of the workpiece from the mathematically operated position thereof is detected by using the line sensor and that the displacement is used as feed-back information when detecting the subsequent position of the workpiece to be mechanically processed.

Figure 1C:
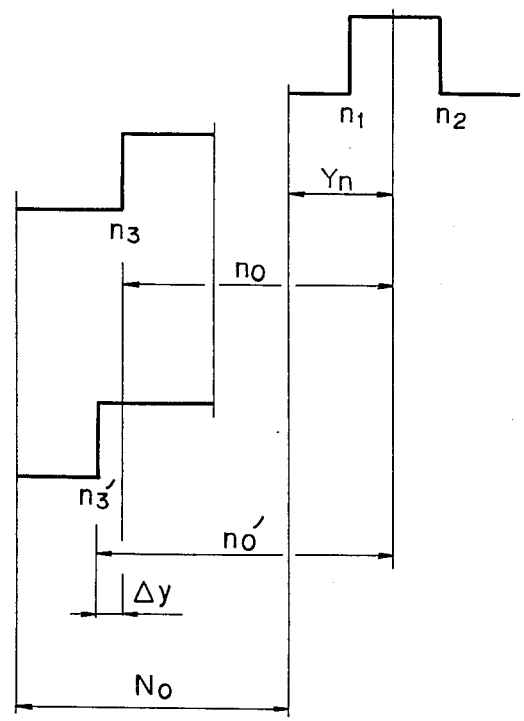
FIG. 1C is a diagram illustrating the wave-shapes of outputs from the opto-electric line sensor of FIG. 1A when the position detecting pattern and an edge of the workpiece after a mechanical processing are both sensed by the opto-electric line sensor.

FIG. 1C illustrates an example of the wave-shapes of outputs from the line sensor when there is a displacement between the actual and theoretical processing (severing) positions of a workpiece.

Referring to FIG. 1C, if the workpiece is severed at the exact theoretical position detected on the basis of a position detecting pattern, such as the pattern 1 of FIG. 1A, the actually severed position of the workpiece must be detected by the line sensor 5 at a position $n_3$ spaced apart by a distance $n_0$ from the center line 4 of the position detecting pattern 1 of FIG. 1A. However, when there is a displacement $\Delta y$, the actually severed position is detected at a position $n_3'$ spaced apart by a distance $n_0' = n_0 + \Delta y$, from the center line 4 of the position detecting pattern 1 of FIG. 1A. That is, by measuring and detecting the distance $n_0'$ from the center line 4 of the position detection pattern 1, the displacement $\Delta y$ can be obtained from the following equation.

$$\Delta y = n_0' - n_0$$

The obtained displacement $\Delta y$ is supplied to the drive unit (not shown) of the worktable on which the workpiece is mounted, as feedback information. As a result, it is possible to perform a fine adjustment of the subsequent position alignment of a position of the workpiece to be subsequently severed with the severing tool, i.e., the abrasive wheel. The fine adjustment operation is performed with respect to every two successive position aligning and mechanical processing operations so that each position aligning and mechanical processing step is carried out at a high accuracy. Accordingly, it is possible to eliminate a displacement between the mathematically processed position and the actually processed position due to a temperature raise caused by, for example, a frictional heat between the processing tool and the processed workpiece during the repeated mechanically processing operation of the workpiece.

At this stage, it should be understood that the position $n_3'$ of FIG. 1C can be detected from the signals from the line sensor 5 through counting, by a pulse counter, the number of clock pulses issued during the time period from when the position spaced apart by a known distance $N_0$ from the 0-bit position of the line sensor 5 is scanned to the time that the actually processed position of the workpiece is scanned.

Figure 2A:
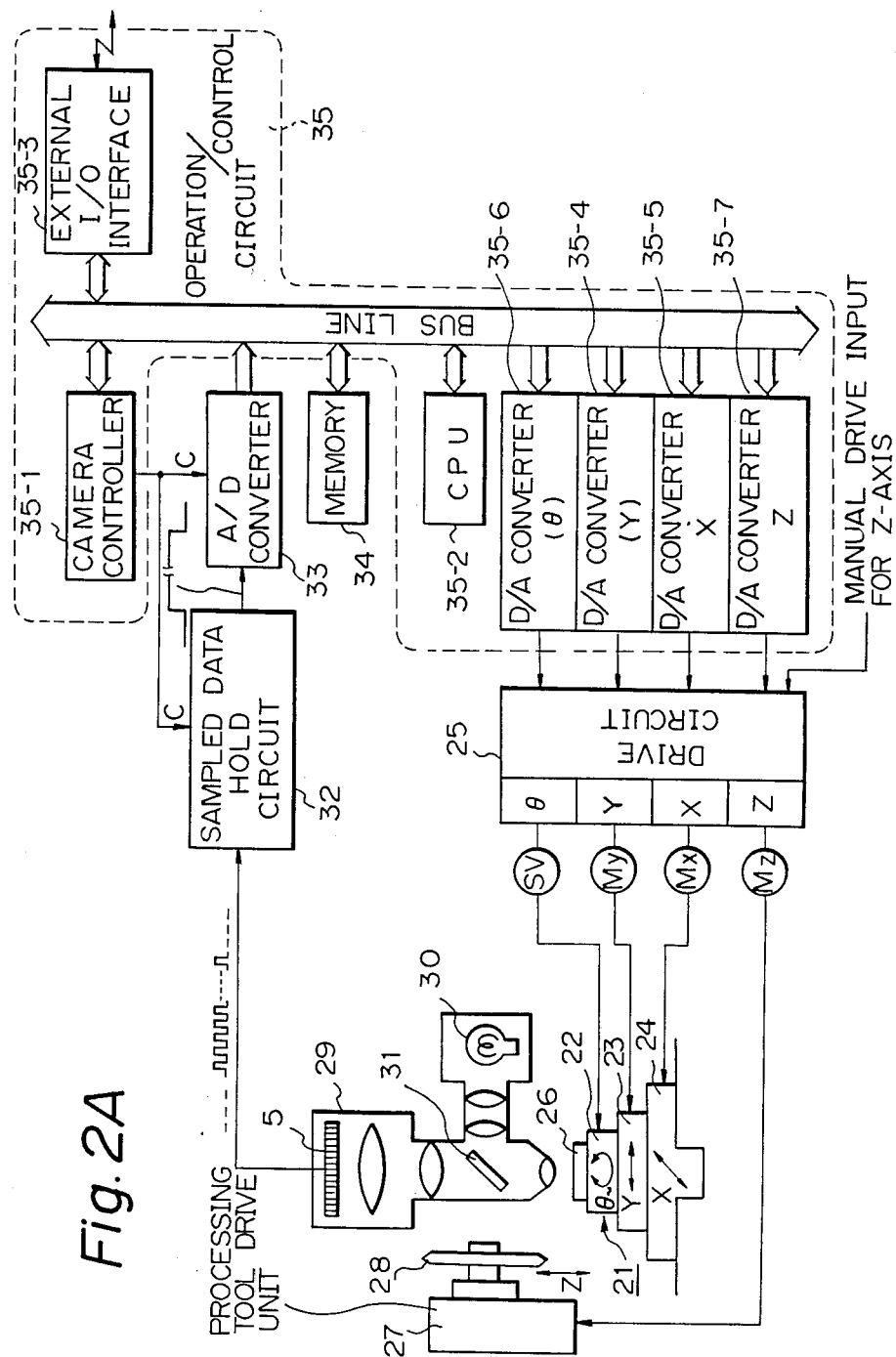
FIG. 2A is a schematic block diagram of an arrangement for mechanically processing a workpiece, according to an embodiment of the present invention.

FIG. 2A illustrates an arrangement for mechanically processing a workpiece having a position detecting pattern or patterns formed thereon by using a position aligning unit including a line sensor, according to an embodiment of the present invention.

Referring to FIG. 2A, a worktable 21 includes a rotatable table 22 rotatable about a vertical axis in the directions of $\theta$, a Y-axis moving table 23 for moving the rotatable table 22 in the Y-axis direction, and a X-axis moving table 24 for moving the rotatable table 22 as well as the Y-axis table 23 in the X-axis direction. The above mentioned three tables 22 through 24 are arranged so as to be driven by a drive unit 25 via a servo valve SV, a Y-axis motor My, and an X-axis motor Mx. A workpiece 26 to be mechanically processed is disposed and held on the rotatable table 22 of the worktable 21. A processing tool drive unit 27 is arranged at a fixed position spaced apart from the worktable 21, and carries thereon a mechanical processing tool 28, such as an abrasive wheel for severing the workpiece 26 into a plurality of separate pieces. The processing tool drive unit 27 contains therein a tool drive source (not shown), such as an electric drive motor, and a feed mechanism for moving the mechanical processing tool 28 in the Z-axis so that the tool 28 may be engaged with and effect a mechanical processing of the workpiece 26 when the workpiece is brought to a predetermined position suitable for the mechanical processing. Thus, the processing tool drive unit 27 is electrically connected to the drive circuit 25 via a feed motor Mz. As required, the unit 27 can be operated by a manual drive input for the Z-axis so that a necessary feed motion is given to the processing tool. it is to be noted that the position of the mechanical processing tool 28 carried by the processing tool drive unit 27 is the predetermined position with which the one or plural desired positions of the workpiece 26 must be accurately aligned before the start of a corresponding mechanical processing operation. Therefore, when each desired position of the workpiece 26 to be mechanically processed is detected and aligned with the position of the tool 28, the processing tool drive unit 27 is operated by a signal from the drive circuit 25 so as to effect the processing operation to the aligned position of the workpiece 26 on the worktable 21.

The predetermined position of the mechanical processing tool 28 is spaced apart by a pre-selected distance from a later-described position aligning unit 29 including a CCD type line sensor 5. The position aligning unit 29 is disposed at a position suitable for properly detecting a position detecting pattern or patterns formed on the surface of the workpiece 26 held on the rotatable table 22 of the worktable 21.

In the illustrated embodiment, the position aligning system 29 is disposed above the worktable 21. The position aligning system 29 includes a light source 30 from which a beam of light can be projected onto one of the position detecting patterns of the workpiece 20, via a half mirror 31 which permits the light reflected from the pattern of the workpiece 26 to be projected onto the line sensor 5. The line sensor 5 is thus able to detect a position of the workpiece 26 which should be aligned with the predetermined position of the mechanically processing tool 28, according to the principles described with reference to FIGS. 1A through 1C. Further, when the worktable 21 is moved relative to the line sensor 5 in the direction parallel to the line sensor 5, i.e., in the Y-axis direction in the case of the embodiment of FIG. 2A, a different one of the position detecting patterns of the workpiece 26 can be sensed by the line sensor 5.

When each position detecting pattern of the workpiece 26 is formed so as to have the same shape as that of FIG. 1A, the output signals of the line sensor 5 derived through a sampled data holding circuit 32 have the wave-shape as shown in FIG. 1B. The outputs of the sampled data holding circuit 32, which are analog signals are converted into digital signals by an analog to digital converter (A/D converter) 33, and are then sent, via a bus line, to a memory 34 in which the digital signals are registered in succession in respective addresses corresponding to respective X- and Y-coordinates, in response to successive address signals of an operation and control circuit 35.

The operation and control circuit 35 includes a camera controller 35-1 which issues clock pulses for controlling the operation timing of the sampled data holding circuit 32 and the A/D converter 33. The operation and control circuit 35 takes the registered signals $n_1$ and $n_2$ necessary for conducting the calculation of the aforementioned equations (1) and (2) out of the addresses of the memory 34, and performs the calculation of these equations in a central processing unit (CPU) 35-2 to obtain the values of Xn and Yn. Subsequently, the operation and control circuit 35 further performs the calculations in the CPU 35-2 to obtain Y-axis and Y-axis displacements of (Yh-Yn) and (Xh-Xn), and generates control output signals to compensate for both Y-axis and X-axis displacements, via D/A converters 35-4 and 35-5. Also, when later-described position detecting patterns are formed on the workpiece 26, which is held on the rotatable table 22, the operation and control circuit 35 is able to control the generation of control signals via D/A converter 35-6 for compensating for any rotational displacement of the workpiece 26 with respect to a fixed rectangular coordinate system.

The above-mentioned control signals are supplied to the above-mentioned drive circuit 25. The drive circuit 25, therefore, drives the Y-axis moving table 23, the X-axis moving table 24, and the rotatable table 22 of the worktable 21 in response to the supplied control signals, via respective drive motors My, Mx, and servo valves SV, until the above-mentioned displacements in the Y-axis direction, the X-axis direction and in the direction $\theta$ are eliminated. When all displacements are eliminated, the three tables 22, 23, and 24 of the worktable 21 are stopped at the controlled positions. As a result, the workpiece on the worktable 21 reaches a position such that a desired position of the workpiece 26 corresponding to the position 3 of FIG. 1A is aligned with the position of the mechanical processing tool 28, and is ready to be subjected to a mechanical processing by the tool 28.

Figure 3:
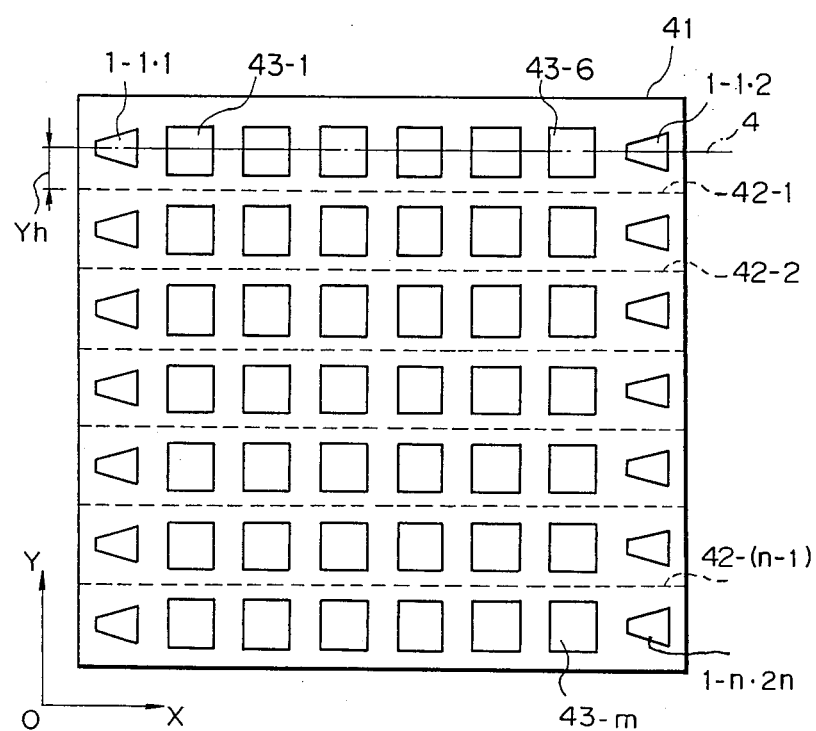
FIG. 3 is a plan view of a semiconductor wafer having a plurality of semiconductor chips, i.e., a workpiece to be mechanically processed, illustrating the shapes and locations of position detecting patterns formed on the semiconductor wafer.

Referring now to FIG. 3, a semiconductor wafer 41 is shown as an example of the workpiece 26, which is to be mechanically processed (to be severed) by e.g., the mechanical processing arrangement of FIG. 2A. The semiconductor wafer 41 is formed with a plurality of position detecting patterns 1-1.1~1-n.2n at respective predetermined positions on the surface of the semiconductor wafer 41. Dotted lines 42-1~42-(n−2) extending in parallel with the X-axis of a fixed rectangular coordinate system for defining each position on the surface of the semiconductor wafer 41 indicate respective Y-axis positions of the semiconductor wafer 41 to be severed by a severing tool, such as an abrasive wheel as shown in the arrangement of FIG. 2A. A plurality of semiconductor chips 43-1~43-m are also formed, on the surface of the semiconductor wafer 41.

When the respective positions 42-1~42-(n−2) are subsequently severed, the semiconductor wafer 41 is disposed on the worktable 21 (FIG. 2A), and subjected to successive position alignment operations by the arrangement of FIG. 2A, so that the respective positions 42-1~42-(n−2) are subsequently aligned with the severing tool. At this stage, it is to be noted that the position detecting patterns 1-1.1~1-n.2n are arranged so that the center line 4 (the latent reference line) of the pair of the uppermost patterns 1-1.1 and 1-1.2 is used for determining the first severing line 42-1, and that the center line 4 of the pair of next patterns 1-1.3 and 1-1.4 is used for determining the second severing line 42-2. The other severing positions 42-3 through 42-(n−2) are also determined in the same manner. The distance between the center line 4 of each pair of the position detecting patterns and the corresponding severing position is predetermined to be Yh (this corresponds to Yh of FIG. 1A). In the case of the example of FIG. 3, the shape of each position detecting pattern 1-1.1~1-n.2n is a trapezoid symmetrical with regard to the center line 4 thereof.

In the actual detection of the respective severing positions 42-1~42-(n−2), only one of the pair of position detecting patterns may be used. However, when both of the pair of patterns, for example, the position detecting patterns 1-1.1 and 1-1.2, are used for detecting the corresponding severing position, e.g., the severing position 42-1, it is possible to detect an angular displacement $\theta$ of the severing line 42-1 of the semiconductor wafer 41 with regard to the rectangular coordinate system. Thus, by using the rotatable table 22 (FIG. 2A), the angular displacement of the severing line of the semiconductor wafer 41 is easily eliminated. As a result, the accuracy of detection of the severing line can be enhanced. In this connection, the operation/control circuit 35 of the arrangement of FIG. 2A is so constructed that the above-mentioned angular displacement $\theta$ can be calculated by the CPU 35-2. Then, based upon the calculation of the angular displacement $\theta$, the operation/control circuit 35 generates a control signal which is supplied to the drive circuit 25, via the D/A converter 35-6. Consequently, the drive circuit 25 drives the rotatable table 22, via the servo valve SV until the angular displacement $\theta$ is eliminated. A typical mechanism for rotating the rotatable table 22 is disclosed, for example, in U.S. Pat. No. 4,504,048 to Shiba et al. An external I/O interface 35-3 of the operation/control circuit 35 of FIG. 2A is used for receiving an external command signal for controlling the movement of the mechanical processing tool 28 in the Z-axis direction, which signal is supplied to the drive circuit 25, via an D/A converter 35-7.

The description of the feedback adjustment performed by the arrangement of FIG. 2A when a plurality of processing positions of the same workpiece 26, e.g., the severing positions 42-1~42-(n−1) of the semiconductor wafer 41, should be mechanically processed (severed), will be described hereinbelow.

When the position alignment and mechanical processing of the first processing position of the workpiece 26 is completed, the operation/control circuit 35 issues a control signal according to a preliminary program stored in the memory 34, to move the worktable 21 in the Y-axis direction by a predetermined amount of movement. The control signal is sent to the drive circuit 25. The predetermined amount of movement of the worktable 21 is chosen so that the actually severed first position of the workpiece 26 is located directly beneath the line sensor 5 of the position aligning unit 29. Thus, when the worktable 26 is moved, the output of the position aligning unit 29 is electrically taken in a similar manner to the first time position aligning operation. As a result, the output of the line sensor 5 of the position aligning unit 29 as shown in FIG. 1C is obtained. That is, the signal $n_3'$ (FIG. 1C) indicating the actually severed first position of the workpiece 26 is first taken. Subsequently, from the information of the center line 4 of the position detecting pattern of the first position, stored in the memory 34, the calculation for obtaining the information $n_0'$ is performed by the CPU 35-2. Thereafter, the calculation for obtaining the displacement $\Delta y$, i.e., $n_0' - n_0$ is carried out by the CPU 35-2, on the basis of the above obtained information $n_0'$ and the information $n_0$ stored in the memory 34 at the first position aligning operation. At this stage, if the first severing operation of the workpiece 26 is carried out in such a manner that the severed portion of the workpiece 26 is not separated from the remaining portion of the workpiece 26, the position detecting pattern used at the first position is left as it was. Thus, the detection of the center line 4 of the pattern used at the first position may be re-detected by the line sensor 5 of the position aligning unit 29, and may be used for calculating the information $n_0'$ and $n_0$.

After completion of the calculation of the displacement $\Delta y$, the worktable 21 is again moved in the Y-axis direction to an appropriate position where the position detecting pattern for detecting a subsequent severing position (the second severing position) of the workpiece 26 is located beneath the line sensor 5 of the position aligning unit 29. When the movement of the worktable 21 is stopped, the severing position detecting operation by the use of the pattern for the second severing position is performed by the position aligning unit 29 in the same manner as for the first severing position detecting operation. Thus, when the second severing position of the workpiece 26 is detected by the mathematical calculation on the basis of the equations (1) and (2), i.e., when the theoretical second severing position of the workpiece 26 is detected, the tables 22, 23, and 24 of the worktable 21 is driven by the drive circuit 25 according to the control signals from the operation/control circuit 35, until the second severing position of the workpiece 26 is aligned with the position of the mechanical processing tool 28. At this time, on the basis of the afore-obtained displacement $\Delta y$, a feedback control signal is supplied to the drive circuit 25 so that the second severing operation is carried out by the mechanical processing tool 28 without any similar displacement. That is, an adjustment of the position alignment of the severing position is achieved by the position aligning unit 29, the operation/control circuit 35, and the worktable drive mechanism having the drive circuit 25.

From the foregoing description, it will be understood that according to the present invention, from the result of the preceding position aligning and mechanical processing operation, an adjustment of the subsequent position aligning and mechanical processing operation is achieved. Therefore, it is ensured that the accuracy of the mechanical processing of a workpiece is maintained at a high level even if the mechanical processing operations are repeated with a single workpiece.

Figure 2B:
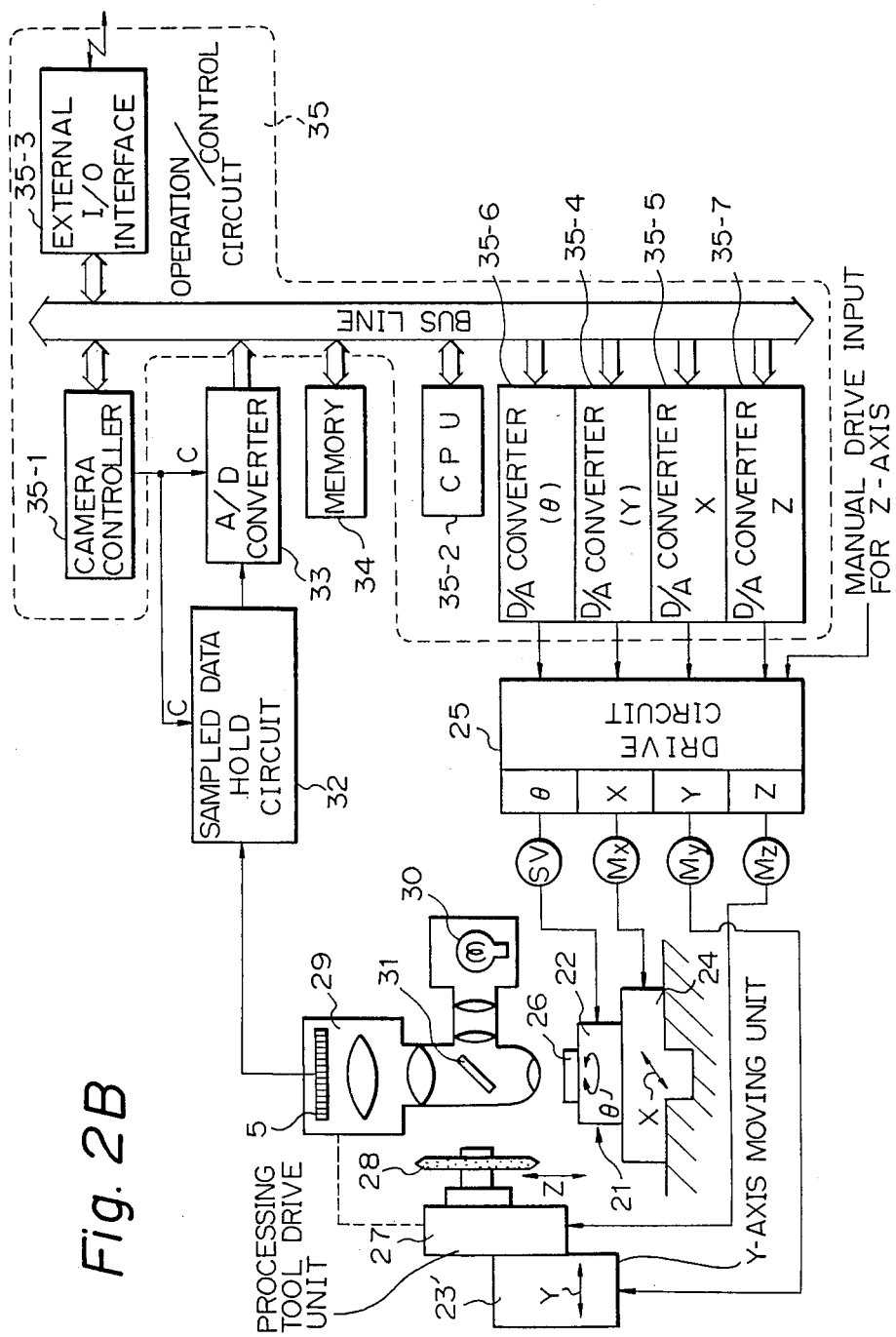
FIG. 2B is a schematic block diagram of an arrangement for mechanically processing a workpiece according to another embodiment of the present invention.
Figure 2C:
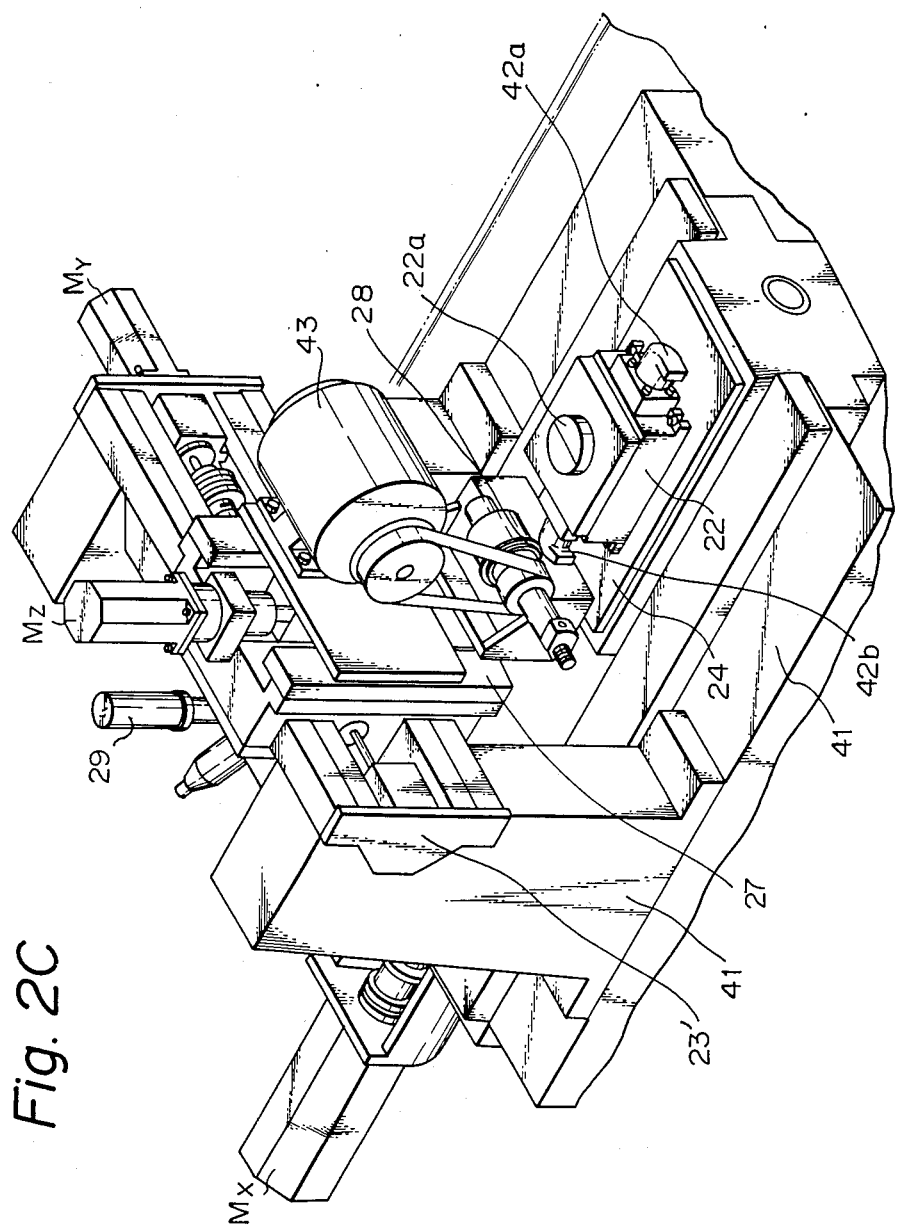
FIG. 2C is a perspective view of a mechanical processing apparatus incorporating the arrangement of FIG. 2B.

FIGS. 2B and 2C illustrate another embodiment of a mechanical processing arrangement of a workpiece with a position detecting pattern or patterns. This embodiment is different from that of FIG. 2A in that the Y-axis moving table 23 of FIG. 2A is omitted from the worktable 21, and the processing tool drive unit 27 is carried on a Y-axis moving unit 23' arranged apart from the worktable 21. It should be understood that, since the position aligning unit 29 having the line sensor 5 is mechanically connected to the Y-axis moving unit 23' so as to always maintain a fixed positional relationship between the position aligning unit 29 and the mechanical processing tool 28, the principle of the operation of the arrangement of FIG. 2B can be the same as that of the arrangement of FIG. 2A.

Referring to FIG. 2C, the arrangement of FIG. 2B is assembled into a machine unit having a bed 41 on which the worktable 21 as well as the position aligning unit 29 are commonly mounted. The machine has a drive motor 43 for rotating the mechanical processing tool 28 carried by the processing tool drive unit 27 which is mounted on the Y-axis moving unit 23' linearly movable in the Y-axis direction by the support of a pair of columns fixed on the machine bed 41. The rotatable table 22 of the worktable 21 (FIG. 2B) has a workpiece holder 22a and is rotated by the servo valve SV (FIG. 2B) which has a pair of fluid inlets 42a and 42b.

FIGS. 4A through 9B illustrate various position detecting patterns formed on the surface of a workpiece, different from the typical trapezoid-shape pattern of FIG. 1A. These position detecting patterns may be used in place of the trapezoid-shape pattern of FIG. 1A, especially in the case where the disposition of the workpiece on the worktable is liable to error, to ensure that such disposition errors of the workpiece are eliminated at the stage of the position aligning operation.

Figure 4A:
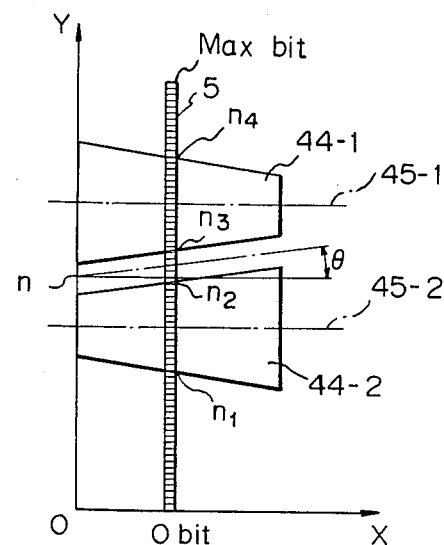
FIG. 4A is a diagrammatic view illustrating position detecting patterns different from that of FIG. 1A and the line sensor similar to that of FIG. 1A.

FIG. 4A illustrates the case where a pair of position detecting patterns 44-1 and 44-2 are detectable by the line sensor 5. The pair of patterns 44-1 and 44-2 have the shape of a trapezoid, respectively, and are disposed one above the another in the Y-axis direction while the center lines 45-1 and 45-2 are maintained parallel to one another and the X-axis of the rectangular coordinate. Note, these lines lie in the opposite direction to the X-axis direction so that the inclined edges thereof having the same inclination angle $\theta$ are inclined in opposite directions to the X-axis direction.

Figure 4B:
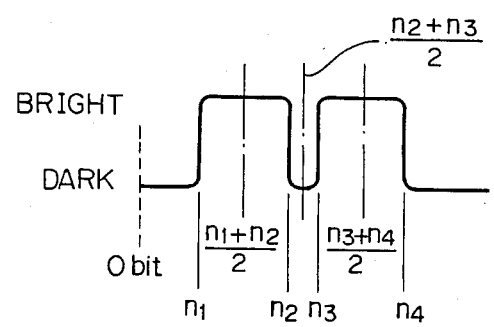
FIG. 4B is a diagram illustrating the wave-shape of an output from the line sensor which senses the position detecting patterns of FIG. 4A.

When the pair of patterns 44-1 and 44-2 are detected by the line sensor 5 in the same manner as in the case of the pattern 1 of FIG. 1A, outputs having the waveshapes as shown in FIG. 4B are delivered from the line sensor 5. Therefore, by counting the number of clock pulses corresponding to the intersecting positions $n_1 \sim n_4$ of the patterns 44-1 and 44-2 with the line sensor 5 from the 0-bit reference position of the line sensor 5, it is possible to obtain the coordinates Xn and Yn of an intermediate line position (the position corresponding to the number of clock pulses n shown in FIG. 4A) between the two center lines 45-1 and 45-2 of the two patterns 44-1 and 44-2 from the following equations (3) and (4).

$$Y_n = K \cdot \{(n_1+n_2)/2 + (n_3+n_4)/2\}/2 \qquad (3)$$

$$X_n = K \cdot \{(n_1+n_2)/2 - n\}/\tan \theta \qquad (4)$$

where K is a constant determined by the size of each sensing element of the line sensor.

Thus, from the obtained values of Yn and Xn of the intermediate line position, it is possible to detect a desired position of the workpiece spaced apart from the intermediate line position by a predetermined or known distance.

Figure 5:
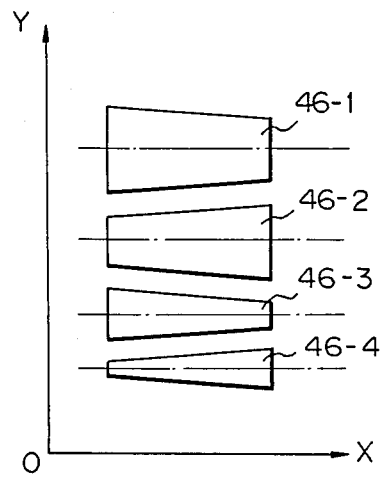
FIGS. 5 and 6 are diagrams illustrating further different position detecting patterns, respectively.

FIG. 5 illustrates the case where four position detecting patterns 46-1~46-4 of a workpiece are disposed in parallel with one another in the Y-axis direction. The four patterns 46-1~46-4 have the shape of an extended trapezoid, and an individual width in the Y-axis direction, respectively, and an equal distance is set between each two adjacent patterns of the four patterns 46-1~46-4. The employment of the four patterns 46-1~46-4 of this embodiment of FIG. 5 enables the detection of not only the Y- and X-coordinates of a position of the workpiece with regard to a fixed rectangular coordinate system but also an angular displacement of the position with regard to the same rectangular coordinate system.

Figure 6:
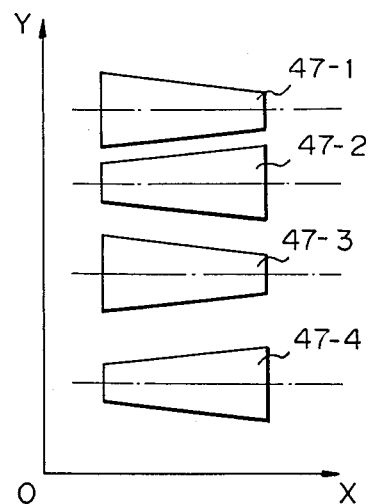

FIG. 6 illustrates the case where the four equal position detecting patterns 47-1~47-4 of a workpiece are disposed in parallel to one another in the Y-axis direction with a different spacing between each two adjacent patterns. However, the four patterns 47-1~47-4 are arranged alternately in the opposite directions in the X-axis direction, as will be understood from FIG. 6. The employment of the pattern arrangement of FIG. 6 is also effective for precisely detecting a desired position of the workpiece and accurately aligning the detected desired position of the workpiece with a predetermined position located apart from the workpiece.

Figure 7A:
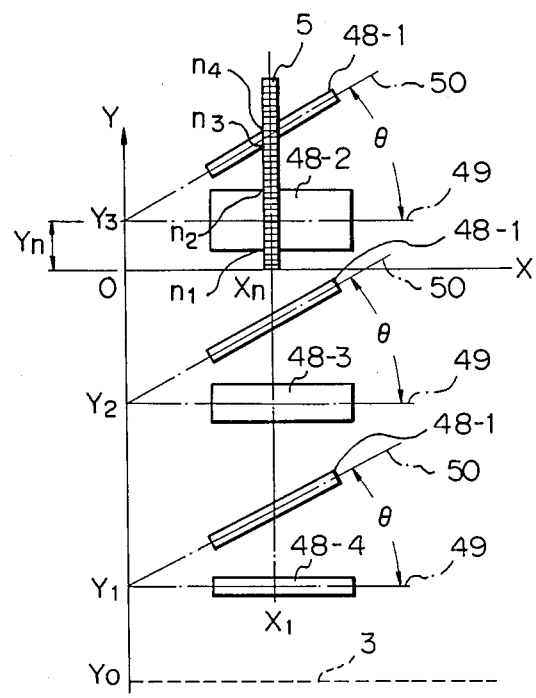
FIG. 7A is a diagrammatic view illustrating position detecting patterns further different from that of FIG. 1A and the line sensor similar to that of FIG. 1A.

FIG. 7A illustrates the case where three pairs of position detecting patterns are formed on a workpiece in such a manner that they are arranged in the Y-axis direction so as to be spaced apart from one another. Each pair has a strip-shape pattern 48-1 having a center line 50 and inclined by an angle $\theta$ with respect to the X-axis, and a rectangle-shape pattern 48-2, 48-3, or 48-4 having a center line 49 disposed in parallel with the X-axis. The widths of the three rectangle-shape patterns 48-2 through 48-4 are made different from one another. By forming these three pairs of patterns 48-1; 48-2, 48-1, 48-3; 48-1; 48-4 on the workpiece, at least one of these three pairs of patterns can be sensed by the line sensor 5 arranged outside a worktable on which the workpiece is disposed and held. Therefore, it is ensured that, even if the workpiece is not accurately mounted on the worktable, the pattern detection of the workpiece can be properly realized.

Figure 7B:
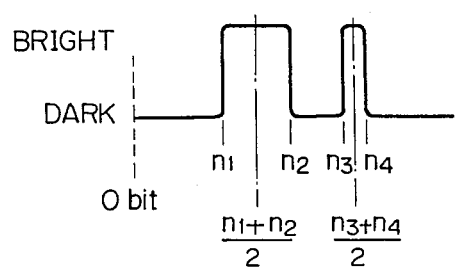
FIG. 7B is a diagram illustrating the wave-shape of an output from the line sensor which senses the position detecting patterns of FIG. 7A.

When the uppermost pair of patterns 48-1 and 48-2 are located beneath the line sensor 5 as shown in FIG. 7A, an output signal having the wave-shape as shown in FIG. 7B is obtained. That is, when the patterns 48-1 and 48-2 are detected by, e.g., the mechanical processing arrangement of FIG. 2A incorporating therein the line sensor 5, the intersecting positions of the two patterns 48-1 and 48-2 are detected by counting the numbers $n_1$, $n_2$, $n_3$, and $n_4$ in the same manner as in the case of the typical trapezoid pattern of FIG. 1A. As a result of the detection, the position coordinate $Y_n$ and $X_n$ of the center line 49 of the pattern 48-2 can be obtained from the following equations (1') and (5).

$$Y_n = K \cdot (n_1 + n_2)/2 \quad (1')$$

$$X_n = K \cdot \{(n_3 + n_4)/2 - (n_1 + n_2)/2\}/\tan \theta \quad (5)$$

When any one of the above-mentioned three pairs of patterns is to be detected, it is necessary to discriminate which pair of patterns is located beneath the line sensor 5. For this purpose, the lower patterns 48-2, 48-3 and 48-4 of the three pairs are formed with a different width in the Y-axis direction. For example, by obtaining the difference $n_2 - n_1$, and comparing it with the preliminarily known values of the widths, it is possible to easily determine that the pattern 48-2 was detected by the line sensor 5. Accordingly, it is also possible to determine which of the positions $Y_3$, $Y_2$, and $Y_1$ should be used to eventually align a desired position $Y_0$, shown by a dotted line 3, with a predetermined position located apart from the worktable on which the workpiece is mounted.

Figure 8A:
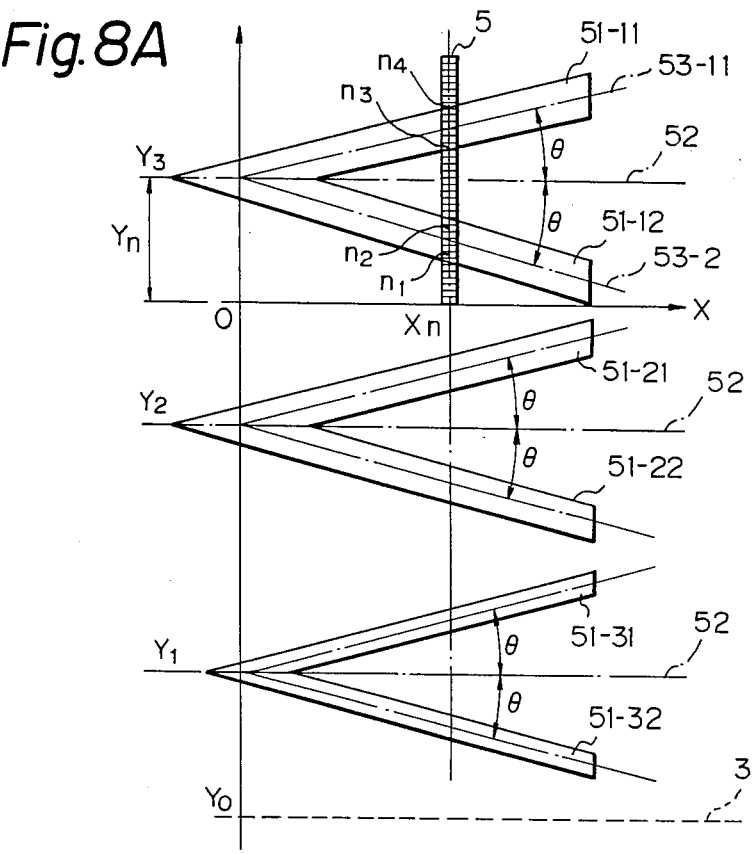
FIG. 8A is a diagrammatic view illustrating position detecting patterns further different from that of FIG. 1A and the line sensor similar to that of FIG. 1A.

FIG. 8A illustrates the case where three V-character shape patterns having a center line 52, respectively, are formed on the surface of a workpiece mounted on the worktable. The three patterns are disposed one above another in the Y-axis direction. The uppermost V-character shape pattern has a pair of strip-like patterns 51-11 and 51-12 inclined by an angle $\theta$ with regard to a line parallel with the X-axis, and having an equal width in the Y-axis direction. The middle V-character shape pattern has a pair of strip-like patterns 51-21 and 51-22 inclined by the angle $\theta$ with regard to a line parallel with the X-axis, and having an equal width in the Y-axis direction. However, the width of each of the two patterns 51-21 and 51-22 is different from that of the uppermost patterns 51-11 and 51-12. The lowermost V-character shape pattern has a pair of strip-like patterns 51-31 and 51-32 inclined by the angle $\theta$ with regard to a line parallel with X-axis, and having an equal width in the Y-axis direction, but the width of each of the two patterns 51-31 and 51-32 is different from those of the uppermost and middle patterns. By forming the above-mentioned three V-character shape patterns on the workpiece, at least one of these three patterns can be sensed by the line sensor 5 arranged outside a worktable on which the workpiece is disposed and held. Therefore, it is ensured that even if the workpiece is not accurately mounted on the worktable, the pattern detection of the workpiece can be achieved with certainty. Each upper side pattern 51-11, 51-21, or 51-31 of the three V-character shape patterns has a center line 53-1 which is inclined upward by the angle $\theta$ with regard to the corresponding center line 52. On the other hand, each lower side pattern 51-12, 51-22, or 51-32 of the three V-character shape patterns has a center line 53-2 inclined downward by the angle $\theta$ with regard to the corresponding center line 52.

Figure 8B:
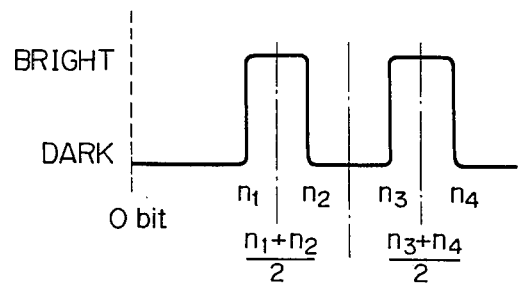
FIG. 8B is a diagram illustrating the wave-shape of an output from the line sensor which senses the position detecting patterns of FIG. 8A.

When one of the three V-character shape patterns is located beneath and sensed by the line sensor 5, e.g., the uppermost V-character shape pattern having the pair of patterns 51-11 and 51-12 is sensed by the line sensor 5, an electric detecting output having the wave-shape as shown in FIG. 8B is obtained through the position aligning and mechanical processing arrangement as shown in FIG. 2A or 2B. Thus, with respect to the 0-bit position of the line sensor 5, the intersecting positions of the patterns 51-11 and 51-12 are detected as signals in the form of the clock pulse numbers $n_1$, $n_2$, $n_3$, and $n_4$. Thus, by using these clock pulse numbers $n_1$, $n_2$, $n_3$, and $n_4$, the position of the center line 52 can be obtained from the following equations (3') and (6).

$$Y_n = K \cdot \{(n_1 + n_2)/2 + (n_3 + n_4)/2\}/2 \quad (3')$$

$$X_n = K \cdot \{(n_3 + n_4)/2 - (n_1 + n_2)/2\}/2 \cdot \tan \theta \quad (6)$$

where K is a constant determined by the size of each sensing element of the line sensor 5.

When any one of the above-mentioned three V-character shape patterns is to be detected, it is necessary to discriminate which one of the three patterns is located beneath the line sensor 5. For this purpose, the three V-character shape patterns (51-11, 51-12; 51-21, 51-22; 51-31, 51-32) are formed with a different width in the Y-axis direction. For example, a difference $(n_4 - n_3)$, or $(n_2 - n_1)$ on FIG. 8A corresponds to the width of the uppermost V-character shape pattern. Therefore, by comparing the difference value with preliminarily known values of the widths of the three patterns, it is possible to easily determine which of the three patterns is located underneath the line sensor 5. As a result, it is also possible to determine which of the positions $Y_3$, $Y_2$, and $Y_1$ should be used to eventually align a desired position $Y_0$, shown by a dotted line 3, with a predetermined position located apart from the worktable on which the workpiece is mounted.

Figure 9A:
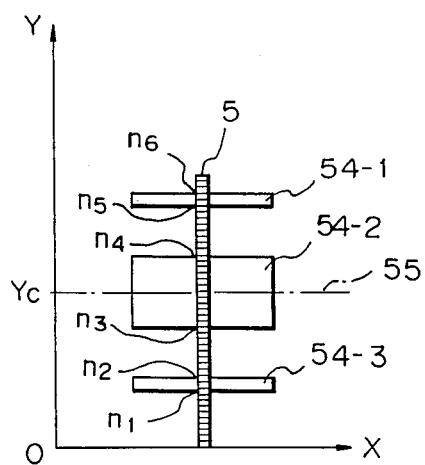
FIG. 9A is a diagram illustrating position detecting patterns used for achieving a precise position alignment of a workpiece.

FIG. 9A illustrates the case where a combination of a plurality of rectangle-shape patterns arranged in parallel to one another and the X-axis, are formed on the surface of a workpiece in order to obtain a higher accurate detection of a position in the Y-axis direction. In the shown example, three patterns 54-1, 54-2, and 54-3 in combination are used. When a center line 55 located at the true middle position of the three patterns is detected by the line sensor 5, the detected position of the center line 55 can be used for precise alignment of the workpiece with regard to a certain predetermined position located outside a worktable on which the workpiece is mounted and held.

Figure 9B:
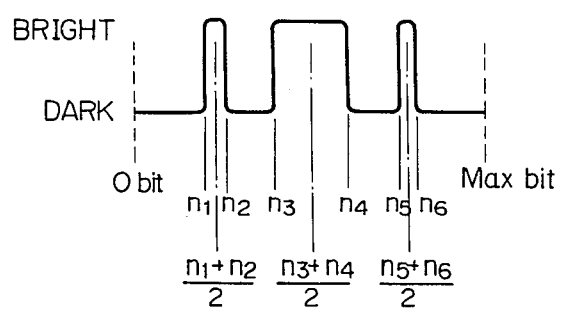
FIG. 9B is a diagram illustrating the wave-shape of an output from the line sensor which senses the position detecting patterns of FIG. 9A.

The shape of output signals of the line sensor 5 is illustrated in FIG. 9B.

The detection of the center line position Yc of the three patterns 54-1~54-3 is achieved by calculation of the following equation (7).

$$Yc = K \cdot \{(n_1 + n_2) + 2(n_3 + n_4) + (n_5 + n_6)\}/8 \qquad (7)$$

It should be understood that the patterns of FIG. 9A are advantageously used in combination with the various patterns shown in FIGS. 5, 6, 7A, or 8A. That is, the patterns of one of these Figures is used to make a rough adjustment of the workpiece, and the patterns of FIG. 9A are then used to make a final fine adjustment of the workpiece with regard to a predetermined position outside the worktable.

From the foregoing description of the embodiments of the present invention, it will be understood that a desired position of a workpiece mounted and held on a worktable can be accurately aligned with a predetermined position outside the worktable, such as the position of a mechanical processing tool, and can be subjected to an accurate mechanical processing, such as severing, scoring, and boring.

It will be understood that variations and modifications of the mechanical processing arrangement of the illustrated embodiments will occur to a person skilled in the art without departing from the scope defined by the appended claims.

We claim:

1. An arrangement for mechanically processing a workpiece having at least one optically sensible position detection pattern formed thereon against which a desired position of the workpiece to be mechanically processed is established, comprising:
    a worktable for mounting a workpiece thereon, arranged to be linearly movable in at least one axial direction of X- and Yperpendicular coordinate axes extending in a plane;
    drive means including a table drive means for linearly moving said worktable in accordance with drive control information;
    a machining tool for effecting a mechanical processing of the workpiece mounted on said worktable when the desired position of the workpiece is moved to and positioned at a predetermined position suitable for engagement with said machining tool;
    a tool carrier carrying said machining tool and provided with a tool feed means for engaging said machine tool with said workpiece when carrying out the mechanical processing of said workpiece;
    a position aligning system responsive to at least one position detecting pattern having a latent reference line and at least one side line inclined relative to one of the X and Y coordinate axis at a predetermined angle for carrying out a position alignment of said desired position of said workpiece with said predetermined position suitable for engagement with said machine tool, said position aligning system including:
        a position detector arranged at a fixed position with respect to said machining tool, and having an optoelectric line sensor including means for issuing an electrical signal indicating a linear amount of displacement of said position detecting pattern of said workpiece in at least one axial direction of said X- and Y-coordinate axes by scanning said position detecting pattern in a predetermined single axial direction of said X- and Y-coordinate axes when said workpiece mounted on said worktable is positioned beneath said position detector, and;
        operation and control means connected to said position detector for carrying out a mathematical operation to detect the latent reference line of said position detecting pattern and said desired position of said workpiece to be mechanically processed in accordance with said electrical signal from said position detector, said operation and control means being further connected to said table drive means for providing said table drive means with said drive control information for moving said worktable until said desired position of said workpiece to be mechanically processed is aligned with said predetermined position suitable for engagement with said machine tool.

2. An arrangement for mechanically processing a workpiece according to claim 1, wherein said worktable is arranged so as to be moved in both directions of the X- and Y-perpendicular coordinate axes by said table drive means of said drive means, and wherein said tool carrier is non-movably arranged so as to hold said machining tool at a fixed position with respect to said X- and Y-perpendicular coordinate axes, said tool carrier being formed so as to be mechanically integral with said position detector of said position aligning system.

3. An arrangement for mechanically processing a workpiece according to claim 2, wherein said worktable is arranged so as to be further rotatable about an axis vertical to the plane of the X- and Y-perpendicular coordinate axes, wherein said drive means includes a table rotating means for rotating said worktable about said axis vertical to the plane of the X- and Y-perpendicular coordinate axes in accordance with rotation control information, and wherein said operation and control means is connected to said table rotating means and is able to further carry out a mathematical operation to detect an angular displacement of said latent reference line of said position detecting pattern with respect to the X- and Y-perpendicular coordinate axes, thereby providing said table rotating means with said rotation control information until said angular displacement of said latent reference line of said position detecting pattern is eliminated.

4. An arrangement for mechanically processing a workpiece according to claim 1, wherein said worktable is linearly movable in a first axial direction of the X- and Y-coordinate axes by said table drive means of said drive means, and wherein said tool carrier carrying said machining tool is movable in a second axial direction perpendicular to the first axial direction in the plane of the X- and Y-coordinate axes and is also formed so as to be mechanically integral with said position detector of said position aligning system, and wherein said drive means includes a tool carrier drive means for linearly moving said tool carrier in the second axial direction.

5. An arrangement for mechanically processing a workpiece according to claim 1, wherein said operation and control means comprises a first means for mathematically calculating a positional difference between said desired position of said workpiece to be mechanically processed and an actually processed position of said workpiece detected by said opto-electric line sensor after completion of a preceding one of every two successive mechanical processing operations of said workpiece, and a second means for generating a feedback drive information on the basis of said positional difference calculatd by said first means and for supplying said feedback drive information to said table drive means of said drive means prior to commencement of the remaining one of said every two successive mechanical processing operations of said workpiece.

6. An arrangement for mechanically processing a workpiece according to claim 1, wherein said machining tool is a severing wheel rotationally driven by a drive motor held in said tool carrier for severing said workpiece.

7. An arrangement for mechanically processing a workpiece according to claim 1, wherein said opto-electric line sensor is a CCD linear image sensor.

8. An apparatus for severing a workpiece having at least one optically sensible position detecting pattern formed thereon against which a desired severed position of the workpiece is established, comprising:
a fixed machine bed;
a worktable for mounting a workpiece thereon, arranged on the fixed machine bed so as to be linearly movable in at least one axial direction of the X- and Y-perpendicular coordinate axes extending in a horizontal plane;
table drive means for linearly moving said worktable in accordance with drive control information, said table drive means including at least a drive motor for drive linear movement of said worktable via a feed mechanism, and a drive circuit connected to said drive motor;
a rotatable abrasive wheel for severing at the desired severing position of said workpiece mounted on said worktable when said desired position of said workpiece is moved to and positioned at a predetermined position suitable for engagement with a severing edge of said abrasive wheel;
a tool carrier arranged on said fixed machine bed at a position spaced from said worktable and carrying said abrasive wheel, said tool carrier being provided with a tool feed means for engaging said abrasive wheel with said workpiece when severing said workpiece;
a position aligning system responsive to at least one position detecting pattern having a latent reference line and at least one side line inclined relative to one of the X and Y coordinate axes at a predetermined angle for carrying out a position alignment of said desired severing position of said workpiece with said predetermined position suitable for engagement with said abrasive wheel, said position aligning system including:
a position detector arranged above said worktable while maintaining a fixed positional relationship with respect to said abrasive wheel, said position detector having a CCD type line sensor having means for issuing an electrical signal indicating a linear amount of displacement of said position detecting pattern of said workpiece in at least one axial direction of said X- and Y-coordinate axes by scanning said position detecting pattern in a predetermined single axial direction of said X- and Y-coordinate axes when said workpiece mounted on said worktable is positioned directly beneath said position detector, and;
operation and control means electrically connected to said position detector for carrying out a mathematical operation to detect the latent reference line of said position detecting pattern and said desired severing position of said workpiece in accordance with said electrical signal from said position detector, said operation and control means being further electrically connected to said drive circuit for providing said table drive motor with said drive control information for moving said worktable until said desired severing position of said workpiece is aligned with said predetermined position suitable for engagement with said abrasive wheel.

9. An apparatus for severing a workpiece according to claim 8, wherein said workpiece is a semiconductor wafer having said position detecting pattern, for being severed into a plurality of semiconductor chips.

10. An apparatus for severing a workpiece according to claim 9, wherein said position detecting pattern is trapezoidal in configuration having a latent center line forming said latent reference line and arranged so that said latent center line extends parallel to one of the axial directions of the X- and Y-perpendicular coordinate axes extending in a horizontal plane.

11. An arrangement for mechanically processing a workpiece as in claim 1, wherein the means for determining the linear displacement of said position detecting pattern from said at least one coordinate axis includes means for determining the product of
(a) a number of clock pulses corresponding to the position of said at least one side line from said at least one coordinate axis, and
(b) a constant corresponding to the size of each line sensor, and
(c) The tangent of the angle of inclination of said at least one side line to said single coordinate axis.

12. An apparatus for severing a workpiece as in claim 8, wherein the means for determining the linear displacement of said position detecting pattern from said at least one coordinate axis includes means for determining the product of
(a) a number of clock pulses corresponding to the position of said at least one side line from said at least one coordinate axis, and
(b) a constant corresponding to the size of each line sensor, and
(c) The tangent of the angle of inclination of said at least one side line to said single coordinate axis.

13. An arrangement for mechanically processing a workpiece having at least one optically sensible position detection pattern formed thereon against which a desired position of the workpiece to be mechanically processed is established, comprising:
a worktable for mounting a workpiece thereon, arranged to be linearly movable in at least one axial direction of X- and Y-perpendicular coordinate axes extending in a plane;

drive means including a table drive means for linearly moving said worktable in accordance with drive control information;

a machining tool for effecting a mechanical processing of the workpiece mounted on said worktable when the desired position of the workpiece is moved to and positioned at a predetermined position suitable for engagement with said machining tool;

a tool carrier carrying said machining tool and provided with a tool feed means for engaging said machine tool with said workpiece when carrying out the mechanical processing of said workpiece;

a position aligning system responsive to a position detecting pattern having a first rectangle, a second rectangle parallel to and spaced a predetermined to distance from one side of the first rectangle, and a third rectangle parallel to and spaced a predetermined distance from the opposite side of the first rectangle, said pattern having a latent reference line parallel to said first, second and third spaced rectangles, for carrying out a position alignment of said desired position of said workpiece with said predetermined position suitable for engagement with said machine tool, said position aligning system including:

a position detector arranged at a fixed position with respect to said machining tool, and having an opto-electric line sensor including means for issuing an electrical signal indicating a linear amount of displacement of said position detecting pattern of said workpiece in at least one axial direction of said X- and Y-coordinate axes by scanning said position detecting pattern in a predetermined single axial direction of said X- and Y-coordinate axes when said workpiece mounted on said worktable is positioned beneath said position detector, and;

operation and control means connected to said position detector for carrying out a mathematical operation to detect the latent reference line of said position detecting pattern and said desired position of said workpiece to be mechanically processed in accordance with said electrical signal from said position detector, said operation and control means being further connected to said table drive means for providing said table drive means with said drive control information for moving said worktable until said desired position of said workpiece to be mechanically processed is aligned with said predetermined position suitable for engagement with said machine tool.

14. An apparatus for severing a workpiece having at least one optically sensible position detecting pattern formed thereon against which a desired severed position of the workpiece is established, comprising:

a fixed machine bed;

a worktable for mounting a workpiece therein, arranged on the fixed machine bed so as to be linearly movable in at least one axial direction of the X- and Y-perpendicular coordinate axes extending in a horizontal plane;

table drive means for linearly moving said worktable in accordance with drive control information, said table drive means including at least a drive motor for drive linear movement of said worktable via a feed mechanism, and a drive circuit connected to said drive motor;

a rotatable abrasive wheel for severing at the desired severing position of said workpiece mounted on said worktable when said desired position of said workpiece is moved to and positioned at a predetermined position suitable for engagement with a severing edge of said abrasive wheel;

a tool carrier arranged on said fixed machine bed at a position spaced from said worktable and carrying said abrasive wheel, said tool carrier being provided with a tool feed means for engaging said abrasive wheel with said workpiece when severing said workpiece;

a position aligning system responsive to a position detecting pattern having a first rectangle, a second rectangle parallel to and spaced a predetermined to distance from one side of the first rectangle, and a third rectangle parallel to and spaced a predetermined distance from the opposite side of the first rectangle, said pattern having a latent reference line parallel to said first, second and third spaced rectangles, for carrying out a position alignment of said desired severing position of said workpiece with said predetermined position suitable for engagement with said abrasive wheel, said position aligning system including:

a position detector arranged above said worktable while maintaining a fixed positional relationship with respect to said abrasive wheel, said position detector having a CCD type line sensor having means for issuing an electrical signal indicating a linear amount of displacement of said position detecting pattern of said workpiece in at least one axial direction of said X- and Y-coordinate axes by scanning said position detecting pattern in a predetermined single axial direction of said X- and Ycoordinate axes when said workpiece mounted on said worktable is positioned directly beneath said position detector, and;

operation and control means electrically connected to said position detector for carrying out a mathematical operation to detect the latent reference line of said position detecting pattern and said desired severing position of said workpiece in accordance with said electrical signal from said position detector, said operation and control means being further electrically connected to said drive circuit for providing said table drive motor with said drive control information for moving said worktable until said desired severing position of said workpiece is aligned with said predetermined position suitable for engagement with said abrasive wheel.

15. An arrangement for mechanically processing a workpiece as in claim 13, wherein the means for determining the linear displacement of said position detecting pattern from said at least one coordinate axis includes means for determining the product of
(a) a number of clock pulses corresponding to the position of said at least one side line from said at least one coordinate axis, and
(b) a constant corresonding to the size of each line sensor, and
(c) The tangent of the angle of inclination of said at least one side line to said single coordinate axis.

16. An apparatus for severing a workpiece as in claim 14, wherein the means for determining the linear displacement of said position detecting pattern from said at least one coordinate axis includes means for determining the product of
(a) a number of clock pulses corresponding to the position of said at least one side line from said at least one coordinate axis, and
(b) a constant corresponding to the size of each line sensor, and
(c) The tangent of the angle of inclination of said at least one side line to said single coordinate axis.

* * * * *

UNITED STATES PATENT AND TRADEMARK OFFICE
CERTIFICATE OF CORRECTION

PATENT NO. : 4,794,736

DATED : January 3, 1989

INVENTOR(S) : SHIGEHIRO FUWA ET AL.

It is certified that error appears in the above-identified patent and that said Letters Patent is hereby corrected as shown below:

On the title page, item [73]
Assignees should read: CITIZEN WATCH CO., LTD., NEC CORPORATION and SUMITOMO SPECIAL METAL CO., LTD.

Claim 14: Column 20, Line 30, "Ycoordinate" should read --Y-coordinate--;

Claim 15: Column 20, Line 53, "corresonding" should read --corresponding--.

Signed and Sealed this

Fourteenth Day of November, 1989

Attest:

JEFFREY M. SAMUELS

Attesting Officer     Acting Commissioner of Patents and Trademarks